(12) United States Patent
Suenaga

(10) Patent No.: US 8,351,116 B2
(45) Date of Patent: Jan. 8, 2013

(54) OPTICAL COMPONENT AND PHASE CONTRAST MICROSCOPE USING OPTICAL COMPONENT

(76) Inventor: Yutaka Suenaga, Kanagawa (JP)

( * ) Notice: Subject to any disclaimer, the term of this patent is extended or adjusted under 35 U.S.C. 154(b) by 139 days.

(21) Appl. No.: 12/920,662

(22) PCT Filed: Mar. 5, 2009

(86) PCT No.: PCT/JP2009/054123
§ 371 (c)(1),
(2), (4) Date: Sep. 2, 2010

(87) PCT Pub. No.: WO2009/110527
PCT Pub. Date: Sep. 11, 2009

(65) Prior Publication Data
US 2011/0032608 A1 Feb. 10, 2011

(30) Foreign Application Priority Data
Mar. 6, 2008 (JP) ................................ 2008-056783

(51) Int. Cl.
*G02B 21/14* (2006.01)
*G02B 27/52* (2006.01)

(52) U.S. Cl. ...................................... 359/370
(58) Field of Classification Search .................... 359/370
See application file for complete search history.

(56) References Cited

U.S. PATENT DOCUMENTS

| 2,616,334 A | * | 11/1952 | Zernike | 359/370 |
| 2,655,077 A | * | 10/1953 | Bennett | 359/370 |
| 2,662,187 A | * | 12/1953 | Kavanagh | 250/461.2 |
| 2,687,670 A | * | 8/1954 | Locquin | 359/370 |
| 2,700,918 A | * | 2/1955 | Osterberg et al. | 359/371 |
| 3,628,848 A | * | 12/1971 | Nomarski | 359/371 |
| 4,953,188 A | * | 8/1990 | Siegel et al. | 378/43 |
| 5,086,222 A | | 2/1992 | Shibuya | 250/234 |
| 5,461,516 A | | 10/1995 | Kawano et al. | 359/890 |
| 6,212,009 B1 | * | 4/2001 | Alt-Nedvidek et al. | 359/558 |
| 6,317,261 B1 | * | 11/2001 | Otaki | 359/387 |

FOREIGN PATENT DOCUMENTS

| JP | 26-1083 | 3/1951 |
| JP | 2-89016 | 3/1990 |
| JP | 6-289438 | 10/1994 |
| JP | 9230247 | 9/1997 |

OTHER PUBLICATIONS

International Preliminary Report on Patentability and Written Opinion of the International Searching Authority from corresponding International Application No. PCT/JP2009/054123, mailed Oct. 21, 2010.
International Search Report for PCT/JP2009/054123 filed Mar. 5, 2009, 2 pages.

* cited by examiner

*Primary Examiner* — Mark Consilvio
(74) *Attorney, Agent, or Firm* — Westman, Champlin & Kelly, P.A.

(57) ABSTRACT

In order to furnish an optical component and a phase contrast microscope which can indicate difference of phases of a specimen including information of frequency and color, at least two optical mediums are arranged side by side so that a constant difference of the phases is generated.

5 Claims, 4 Drawing Sheets (a)

(b)

(c)

OPTICAL COMPONENT AND PHASE CONTRAST MICROSCOPE USING OPTICAL COMPONENT

CROSS-REFERENCE TO RELATED APPLICATION

This Application is a Section 371 National Stage Application of International Application No. PCT/JP2009/054123, filed Mar. 5, 2009 and published as WO2009/110527 on Sep. 11, 2009, in English, the contents of which are hereby incorporated by reference in their entirety.

TECHNICAL FIELD

The present invention relates to a Phase contrast microscope and its optical component, in particular, relates to an optical component which changes difference of phases.

BACKGROUND ART

A phase contrast microscope has been introduced as a microscope which can observe clear and colorless living cells without killing them by dyeing or the like. This phase contrast microscope can observe clear and colorless specimens with contrast of light and shade, thereby achieving observation of living cells or the like with living condition.
[Patent document 1] Tokukai-hei 9-230247

As mentioned above, the phase contrast microscope can observe clear and colorless living cells with contrast of light and shade. The phase contrast microscope needs to use a phase plate in order to observe items with contrast of light and shade.

The phase plate is formed of a certain thin membrane, and it can advance or delay a phase by one quarter of the wavelength of the light beam by transmitting the light beam outputted by a light source through the thin membrane. Since a material which composes the thin membrane of the phase plate has dispersion, it cannot make a phase lag of one quarter of the wavelength relating to any wavelengths, thereby reducing a contrast when observing specimens using a light beam with wide range of wavelengths. The ordinary phase contrast microscope has a configuration with a colored filter corresponding to the predetermined wavelength in order to observe items using only a light beam with the predetermined wavelength. According to such configuration, the ordinary phase contrast microscope can make a phase lag of one quarter of the wavelength of the light beam.

However, since the ordinary phase contrast microscope has a configuration with a filter, an image of specimens is expressed only by thickness of plain color. A user, therefore, has to observe specimens without having information relating to color of the specimens.

DISCLOSURE OF THE INVENTION

Means to Solve the Problem

Accordingly, the present invention is made considering the above mentioned problems, and it is an object of the present invention to provide an optical component and a phase contrast microscope, which can show difference of phases including a frequency information and color information.

To solve the problem, in the present invention, at least two optical mediums are arranged side by side so as to generate a constant difference of phases to at least two wavelengths.

Specifically, an optical component of the present invention is an optical component including an input surface which receives light beams of at least two wavelengths, and an output surface which outputs the light beams after changing a phase of the received light beam, comprising an optical medium body which includes at least two optical mediums arranged side by side between said input surface and said output surface, said optical medium body including a first optical medium portion which outputs each of said light beams of at least two wavelengths after changing a phase thereof according to the wavelength, a second optical medium portion which outputs each of said light beams of at least two wavelengths after changing a phase thereof according to the wavelength so that difference between a phase of the light beam outputted from said first optical medium portion and a phase of the light beam outputted from said second optical medium portion is approximately constant.

The optical component of the present invention includes the input surface and the output surface. The input surface receives light beams of at least two wavelengths. The optical component changes a phase of the received light beam. The light beam in which a phase is changed is outputted from the out put surface.

The optical medium body is arranged between the input surface and the output surface of the optical component. It is preferable that surfaces of the optical medium body are formed as the input surface and the output surface. The optical medium body includes at least two optical mediums. The at least two optical mediums are arranged side by side between the input surface and the out put surface.

Further, the optical medium body includes at least a first optical medium portion and a second optical medium portion.

The first optical medium portion receives the above mentioned light beams of at least two wavelengths. The first optical medium portion changes a phase of received light beam according to the wavelength due to its optical property such as a refractive index. The light beam in which a phase is changed is outputted from the first optical medium portion.

The second optical medium portion receives the above mentioned light beams of at least two wavelengths as well as the first optical medium portion. The second optical medium portion also changes a phase of received light beam according to the wavelength due to its optical property such as a refractive index. Further the second optical medium portion changes a phase of received light beam so that difference between a phase of the light beam outputted from said first optical medium portion and a phase of the light beam outputted from said second optical medium portion is approximately constant. The light beam in which a phase is changed in such a way is outputted from the second optical medium portion.

Accordingly, in the case of light beams of at least two wavelengths, difference between a phase of the light beam outputted from said first optical medium portion and a phase of the light beam outputted from said second optical medium portion is almost constant according to the first optical medium portion and the second optical medium portion. In this way, since it can make a phase lag to a plurality of wavelengths, it can adjust a phase of the light beam including information of frequency of the light beam.

In the optical component according to the present invention, said first optical medium portion is composed of at least one optical medium layer, said second optical medium portion is composed of at least one optical medium layer, the following three formulas are applied to said first optical medium portion and said second optical medium portion.

It is preferable to satisfy the following three formulas;

$$\sum_i t_{1i} \times n_1(i, 1) - \sum_j t_{2j} \times n_2(j, 1) = C1\lambda_1$$

$$\sum_i t_{1i} \times n_1(i, 2) - \sum_j t_{2j} \times n_2(j, 2) = C2\lambda_2$$

$$|C1 - C2| < 0.02$$

where a thickness of $i^{th}$ layer of said first optical medium portion is the thickness $t_{1i}$,
a refractive index to the light beam of the wavelength $\lambda 1$ is the refractive index $n_1(i,1)$,
a refractive index to the light beam of the wavelength $\lambda 2$ is the refractive index $n_1(i,2)$,
a thickness of $i^{th}$ layer of said second optical medium portion is the thickness $t_{1j}$,
a refractive index to the light beam of the wavelength $\lambda 1$ is the refractive index $n_2(j,1)$,
a refractive index to the light beam of the wavelength $\lambda 2$ is the refractive index $n_2(j,2)$.

Further, it is preferable to satisfy the following three formulas;

$$t(n_1(1,1)-n_2(1,1))=C1\times\lambda 1$$

$$t(n_1(1,2)-n_2(1,2))=C1\times\lambda 2$$

$$|C1-C2|<0.02$$

In this case, a thickness of said first optical medium portion and said second optical medium portion is the thickness t,
a refractive index of said first optical medium portion to the light beam of the first wavelength $\lambda 1$ is the refractive index $n_1(1,1)$,
a refractive index of said first optical medium portion to the light beam of the second wavelength $\lambda 2$ is the refractive index $n_1(1,2)$,
a refractive index of said second optical medium portion to the light beam of the first wavelength $\lambda 2$ is the refractive index $n_2(1,1)$,
a refractive index of said second optical medium portion to the light beam of the second wavelength $\lambda 2$ is the refractive index $n_2(1,2)$.

Further it is preferable to satisfy the following formula;

$$|n1(i,1)-n2(i,2)|<0.3$$

When presuming that the above mentioned C1 or C2 is C, C should be $$\frac{1}{4} \leq |C| \leq \frac{3}{4}$$

In this case, |C| means an absolute figure of C.

The above mentioned light beams of at least two wavelengths include the first wavelength $\lambda 1$ and the second wavelength $\lambda 2$. In the above mentioned formulas, "t" is a thickness of the first optical medium portion and a thickness of the second optical medium portion. "C" is a constant not related to wavelengths.

Further, n(1,1) is a refractive index of the first optical medium portion to the first wavelength $\lambda 1$, n(2,1) is a refractive index of the first optical medium portion to the second wavelength $\lambda 2$, n(2,1) is a refractive index of the second optical medium portion to the first wavelength $\lambda 1$, and n(2,2) is a refractive index of the second optical medium portion to the second wavelength $\lambda 2$.

With using the optical mediums which satisfy the above mentioned two formulas, a phase of the light beam outputted from the first optical medium portion can be advanced or delayed to the light beam outputted from the second optical medium portion by C both in the case of the light beam of wavelength $\lambda 1$ and the light beam of wavelength $\lambda 2$.

In the optical component of the present invention, it is preferable that said first wavelength $\lambda 1$ and said second wavelength $\lambda 2$ are wavelengths of visual light beams.

Accordingly, it can adjust a phase of the light beam including information of frequency of a visual light, that is, information of color.

Further, an phase contrast microscope of the present invention is an phase contrast microscope including an illumination optical system, and an image optical system, comprising an opening arranged at a pupil position of said illumination optical system,
a phase plate arranged at a position having a conjugated relationship with said opening, said phase plate including an input surface which receives light beams of at least two wavelengths,
an output surface which outputs the light beams after changing a phase of the received light beam, and
an optical medium body which includes at least two optical mediums arranged side by side between said input surface and said output surface,
said optical medium body including
a first optical medium portion which outputs each of said light beams of at least two wavelengths after changing a phase thereof according to the wavelength,
a second optical medium portion which outputs each of said light beams of at least two wavelengths after changing a phase thereof according to the wavelength so that difference between a phase of the light beam outputted from said first optical medium portion and a phase of the light beam outputted from said second optical medium portion is approximately constant.

The phase contrast microscope of the present invention includes the illumination optical system, the image optical system, the opening and the phase plate. The illumination optical system is used for illuminating a specimen. The image optical system is used for focusing the image of the specimen. The opening is arranged at a pupil position of the illumination optical system, and used for limiting a light beam which illuminates the specimen.

The phase plate is arranged at a position having a conjugated relationship with the opening. The phase plate includes the input surface and the output surface. The input surface receives the light beam of at last two wavelengths. The phase plate changes a phase of the received light beam. The light beam in which a phase is changed is outputted from the output surface.

The optical medium body is arranged between the input surface and the output surface of the optical component. It is preferable that surfaces of the optical medium body are formed as the input surface and the output surface. The optical medium body includes at least two optical mediums. The at least two optical mediums are arranged side by side between the input surface and the output surface.

Further, the optical medium body includes at least a first optical medium portion and a second optical medium portion.

The first optical medium portion receives the above mentioned light beams of at least two wavelengths. The first optical medium portion changes a phase of received light beam according to the wavelength due to its optical property such as a refractive index. The light beam in which a phase is changed is outputted from the first optical medium portion.

The second optical medium portion receives the above mentioned light beams of at least two wavelengths as well as the first optical medium portion. The second optical medium portion also changes a phase of received light beam according to the wavelength due to its optical property such as a refractive index. Further the second optical medium portion changes a phase of received light beams so that difference between a phase of the light beam outputted from said first optical medium portion and a phase of the light beam outputted from said second optical medium portion is approximately constant. The light beam in which a phase is changed in such a way is outputted from the second optical medium portion.

Accordingly, in the case of light beams of at least two wavelengths, difference between a phase of the light beam outputted from the first optical medium portion and a phase of the light beam outputted from the second optical medium portion is almost constant according to the first optical medium portion and the second optical medium portion. In this way, since it can make a phase lag to a plurality of wavelengths, it can adjust a phase of the light beam including information of frequency of the light beam. Especially, it can observe a specimen which is near to transparent including its color information. Since it can observe a specimen without using a filter, configuration of the phase contrast microscope can be simplified.

Effect of the Invention

It can show difference of phase of a specimen including information of frequency and color.

DETAILED DESCRIPTION OF EMBODIMENTS

Hereinafter, embodiments according to the present invention are explained based on the drawings.

First Embodiment

<<Configuration of Phase Contrast Microscope>>

Figure 1:
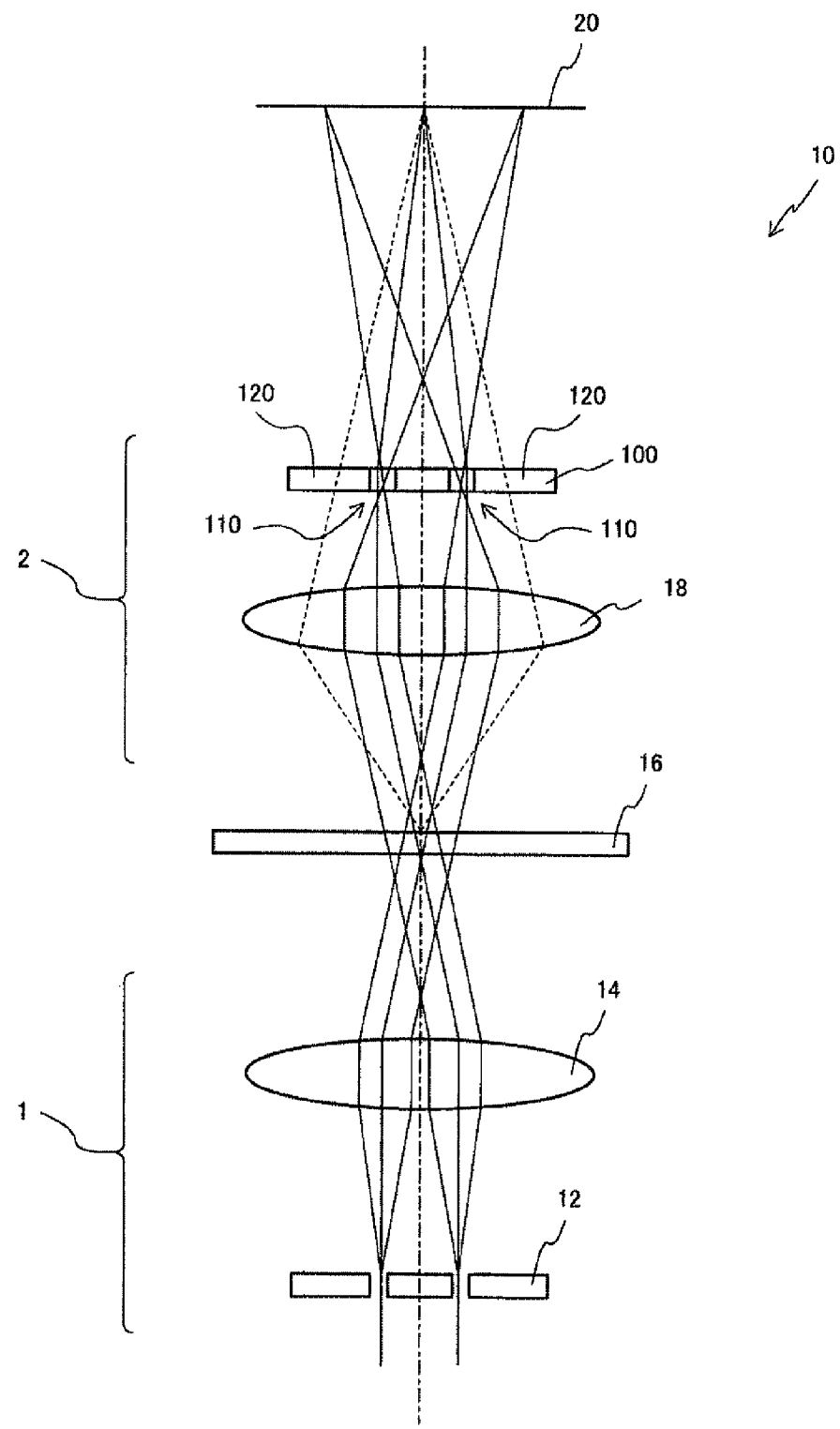
FIG. 1 is a schematic drawing of a phase contrast microscope according to a first embodiment of the present invention.

FIG. 1 illustrates a configuration of a phase contrast microscope 10.

The phase contrast microscope 10 comprises a light source (not shown in the drawing), an aperture ring 12, a condenser lens 14, a field lens 14, a phase plate 100. These components are supported at predetermined positions by a supporting body (not shown in the drawing).

The aperture ring 12 has a ring shape opening and is arranged at a pupil position of a illumination optical system 1, i.e., a front focal surface of the field lens 18 as mentioned later. A light beam outputted by the light source (not shown in the drawing) is converted to a parallel light beam in advance by an optical element such as a collimator lens before reaching the aperture ring 12. A light beam converted to a parallel one is narrowed down by the aperture ring 12 so as to pass only through the ring shape opening, then converted to a ring shape light beam.

The condenser lens 14 converts the light beam which is converted to the ring shape light beam by the aperture ring 12 so as to be focused at a specimen 16 as described later. The light beam which is converted to the focused light beam by the condenser lens 14 forms an image at the specimen 16 as an example. The light beam which incidents the specimen 16 is divided into a direct light beam which transmits strait through the specimen 16 (shown by a solid line of FIG. 1) and a diffractive light beam which is diffracted by a phase object of the specimen 16 and travels on the skew (shown in a dotted line of FIG. 1). The diffractive light beam is diffracted by the phase object as well as a phase of the diffractive light beam is delayed by around one quarter of the wavelength.

The illumination optical system 1 is composed of the above mentioned light source, the aperture ring 12, and the condenser lens 14.

The field lens 18 is positioned in the traveling direction of the direct light beam and the diffractive light beam which are divided by the specimen 16. Further, the phase plate 100 is arranged at a pupil position of an image optical system 2, i.e., a rear focal surface of the field lens 18, which means that the phase plate 100 is positioned at location having a conjugated relationship with the aperture ring 12. The phase plate 100, as mentioned later, is composed of a first optical medium portion 110 and a second optical medium portion 120. The first optical medium portion 110 is formed in a ring shape (Refer to FIG. 2). Construction and function of the phase plate 100 is described in detail later.

The direct light beam which passes through the specimen 16 is converted to a parallel light beam and injected to the phase plate 100. The first optical medium portion 110 of the phase plate 100 which is formed in a ring shape is positioned so as to overlap the direct light beam which is a light beam with a ring shape. Therefore it is said that the inner diameter d1 and the outer diameter d2 of the first optical medium portion 110 which is formed in a ring shape on the phase plate 100 (Refer to (a) and (b) of FIG. 2) correspond to the value calculated by multiplying an inner diameter and an outer diameter of the aperture ring 12 by magnifications of the condenser lens 14 and the field lens 18 respectively.

On the contrary, the diffractive light beam which is diffracted by the phase object of the specimen 16 passes through the outer second optical medium portion 120b as mentioned later, The direct light beam and the diffractive light beam which pass through the phase plate 100 are focused, interfered by each other and form an image on an imaging surface 20.

<Configuration of Phase Plate 100>

Figure 2:
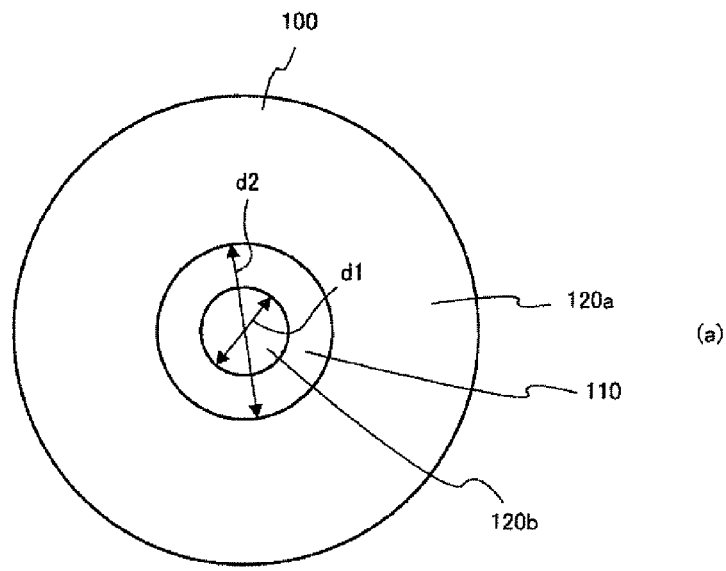
FIG. 2 is a plane view (a), a sectional view (b) and a theoretical explanatory drawing of a phase plate 100 according to a first embodiment of the present invention.
Figure 2:
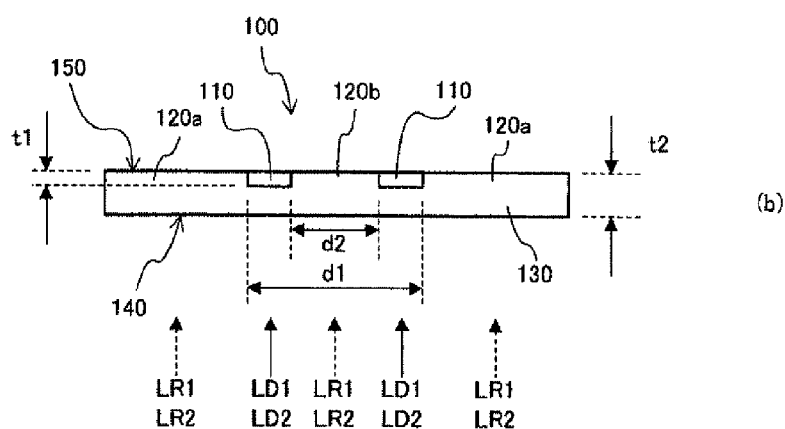
Figure 2:
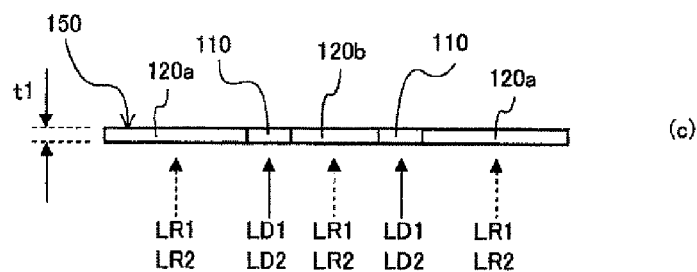

FIG. 2 shows a plane view (a), a sectional view (b) and a theoretical explanatory drawing of the phase plate 100 according to the first embodiment.

The phase plate 100 has an approximately circular plate as shown in FIG. 2(a). The phase plate 100 comprises the first optical medium portion 110 composed of a first optical medium area and the second optical medium portion 120 composed of a second optical medium area. Optical property of the first optical medium portion 110 and the second optical medium portion 120 will be described later. The phase plate 100 has an input surface 140 (a bottom surface shown in FIG. 2 (b)) and an output surface 150 (a top surface shown in FIG. 2 (b)). As mentioned later, a light beam outputted by a light source incidents the input surface 140, passes through the first optical medium portion 110 and the second optical medium portion 120, then is outputted from the output surface 150. Further, a base portion 130 is formed at a side of the input surface 140 of the phase plate 100. The base portion 130 is composed of the second optical medium portion 120 and acts as a base of the phase plate 100.

The first optical portion 100 is positioned at a side of the output surface 150 of the phase plate 100 as shown in FIG. 2(a). The first optical medium portion 110 has a ring shape on the output surface 150. An inner diameter of the first optical medium portion 110 is d1 and an outer diameter of the first optical medium portion 110 is d2. The inner diameter d1 and the outer diameter d2 can be determined according to the magnifications of the condenser lens 14 and the field lens 18. Thickness of the first optical medium portion 110 is t1. The thickness t1 of the first optical medium portion 110 can be determined so as to satisfy Formula 1 and Formula 2 as mentioned later.

On the contrary, the second optical medium portion 120 is positioned at an area of the phase plate 100 excluding the first optical medium portion 110. For easily understanding, the second optical medium portion 120 is separated into an inner second optical medium portion 120a, an outer second optical medium portion 120b, and the base portion 130. The base portion 130 is, as mentioned above, formed at the side of the input surface 140 of the phase plate 100 and acts as the base of the phase plate 100. The above mentioned first optical medium portion 110, inner second optical medium portion 120a and second optical medium portion 120b are formed concentrically.

The inner second optical medium portion 120a is positioned inside of the first optical medium portion 110. The inner second optical medium portion 120a has an approximately circular shape on the input surface 140 and the output surface 150.

A diameter of the inner second optical medium portion 120a is determined according to the above mentioned inner diameter d1 of the first optical medium portion 110. The outer second optical medium portion 120b is positioned outside of the first optical medium portion 110. The outer second optical medium portion 120b has an approximately ring shape on the input surface 140 and the output surface 150. An inner diameter of the outer second optical medium portion 120b is determined according to the outer diameter d2 of the first optical medium portion 110, and an outer diameter of the outer second optical medium portion 120b is determined according to a diameter of the phase plate 100. Thickness of the second optical medium portion 120 is also t1 and it can be determined according to Formula 1 and Formula 2 as mentioned later.

As just described, the first optical medium portion 110 and the second optical medium portion 120 (the inner second optical medium portion 120a and the outer second optical medium portion 120b) is arranged side by side between the input surface 140 and the output surface 150.

The first optical medium portion 110 shows a refractive index $n_1(1,1)$ to a light beam of the wavelength $\lambda 1$, and shows the refractive index $n_1(1,2)$ to a light beam of the wavelength $\lambda 2$. The first optical medium portion 110 preferably made of a plastic, a resin or the like.

On the contrary, the inner second optical medium portion 120a and the outer second optical medium portion 120b show the refractive index $n_2(1,1)$ to a light beam of the wavelength $\lambda 1$, and shows the refractive index $n_2(1,2)$ to a light beam of the wavelength $\lambda 2$.

The inner second optical medium portion 120a and the outer second optical medium portion 120b is preferably a medium having an approximately circular plate shape. The base portion 130 shows the same refractive index because it is also made of the material of the second optical medium portion.

These refractive indexes $n_1(1,1)$, $n_1(1,2)$, $n_2(1,1)$ and $n_2(1,2)$ satisfy the following formulas.

$$t(n_1(1,1)-n_2(1,1))=C1\times\lambda 1 \qquad \text{Formula 1}$$

$$t(n_1(1,2)-n_2(1,2))=C1\times\lambda 2$$

$$|C1-C2|<0.02 \qquad \text{Formula 2}$$

"t" of Formula 1 and Formula 2 is thickness of the first optical medium portion 110, the inner second optical medium portion 120a and the outer second optical medium portion 120b. In the embodiment shown in FIG. 2(b), it is thickness t1, in other words, it is a thickness calculated by deducting the thickness of the base portion 130 from the total thickness t2 of the phase plate 100. The thickness t1 contributes to change of a phase of the first optical medium portion 110 and change of a phase of the second optical medium portion 120. The thickness t1 is one of the elements to make difference between a phase of the light beam passing through the first optical medium portion 110 and a phase of the light beam passing through the second optical medium portion 120.

<Manufacture of Phase plate 100>

The above mentioned phase plate 100 is formed by machining a glass plate having an approximately circular shape. This glass plate becomes the second optical medium portion 120 (the inner second optical medium portion 120a and the outer second optical medium portion 120b) and the base portion 130. In machining process of the glass plate, at first, a groove having a ring shape is formed as concentrically to the phase plate 100 by machining a surface of a side of the output surface 150 of the glass plate. The machining is performed to make depth of the groove U. Then an adhesive agent is poured into the groove and solidified. The solidified adhesive agent becomes the first optical medium portion 110. Since the groove is formed and the first optical medium portion 110 is formed with adhesive agent, the phase plate 100 is made easily and with low costs. Since the groove is formed by machining, thickness of the first optical medium portion 110 can be adjusted according to the thickness of the groove. It is easy to make thickness of the first optical medium portion 110 thin or thick. If it is desired to make thickness of the first optical medium portion 110 thick, it may be formed by a thin film forming process such as a deposition or a sputtering.

A resin material such as a clear plastic may be utilized as the second optical medium portion 120 instead of a glass plate if the above mentioned Formula 1 and Formula 2 are satisfied. Accordingly, the phase plate 100 can be made easily with low costs.

<Function of Phase plate 100>

As mentioned above, the light beam outputted by the light source is divided into the direct light beam and the diffractive light beam by the phase object of the specimen 16. A phase of the diffractive light beam is delayed by approximately one quarter of the wavelength when it is diffracted by the phase object of the specimen 16. On the contrary, the direct light beam is not diffracted by the phase object of the specimen 16 and its phase is not changed.

As shown in the dotted line in FIG. 1, traveling direction of the diffractive light beam is adjusted by the field lens 18 so as to pass through the inner second optical medium portion 120a and the outer second optical medium portion 120b of the phase plate 100. Specifically, the diffractive light beam which reaches the input surface 140 of the phase plate 100 passes through the base portion 130. Then, the diffractive light beam which passes through the base portion 130 reaches the inner second optical medium portion 120a and the outer second optical medium portion 120b. Further, the light beam passes through the inner second optical medium portion 120a and the outer second optical medium portion 120b, then is outputted from the output surface 150 of the phase plate 100, and travels toward the image surface 20. As mentioned above, while traveling direction of the diffractive light beam is explained using the inner second optical medium portion 120a, the outer second optical medium portion 120b and the base portion 130, which are divided for easily understanding, there is no actual border line and no border surface.

On the contrary, as shown in the solid line in FIG. 1, traveling direction of the direct light beam is adjusted by the field lens 18 so as to pass through the first optical medium portion 110 of the phase plate 100. Specifically, the direct light beam which reaches the input surface 140 of the phase plate 100 passes through the base portion 130. Then, the direct light beam which passes through the base portion 130 reaches the first optical medium portion 110. Further, the light beam passes through the first optical medium portion 110, then is outputted from the output surface 150 of the phase plate 100, and travels toward the image surface 20.

As mentioned above, both the direct light beam and the diffractive light beam pass through the base portion 130 after they enter the phase plate from the input surface 140. Therefore, phases of both the direct light beam and the diffractive light beam are changed in the same way by the refractive index of the second optical medium portion 120 of which the base portion 130 is composed and by the thickness of the base portion 130. Therefore, difference between a phase of the direct light beam and a phase of the diffractive light beam before passing through the base portion 130 is the same as difference of the phases after passing through the base portion 130.

After passing through the base portion 130, the direct light beam passes through the first optical medium portion 110, and the diffractive light beam passes through the inner second optical medium portion 120a and the outer second optical medium portion 120b. Accordingly, a phase of the direct light beam is changed by the refractive index and thickness of the first optical medium portion 110, and a phase of the diffractive light beam is changed by the refractive index and thickness of the inner second optical medium portion 120a and the outer second optical medium portion 120b. Therefore, it makes difference between difference of phases of the direct light beam and the diffractive light beam just after passing through the base portion 130 and difference of phases of the direct light beam and the diffractive light beam when outputted from the output surface 150 of the phase plate 100. Difference between a phase of the direct light beam and a phase of the diffractive light beam after passing through the base portion 130 is approximately one quarter of the wavelength, which is caused by the phase object of the specimen 16.

While the base portion 130 affects a phase of the direct light beam and a phase of the diffractive light beam, it does not affect difference between a phase of the direct light beam and a phase of the diffractive light beam when outputted from the output surface 150 of the phase plate 100. On the contrary, the first optical medium portion 110, the inner second optical medium portion 120a and the outer second optical medium portion 120b which satisfy Formula 1 and Formula 2 affect difference between phases of the direct light beam and a phase of the diffractive light beam when outputted from the output surface 150 of the phase plate 100.

Hereinafter, light beams of the wavelength $\lambda_1$ and the wavelength $\lambda_2$ are explained in detail using FIG. 2(c) which is a principle drawing. The base portion 130 of the phase plate 100 shown in FIG. 2(b) is omitted in FIG. 2(c)

A light beam having the wavelength $\lambda_1$ is divided into a direct light beam LR1 and a diffractive light beam LD1 by a specimen 16.

The direct light beam LR1 incidents a first optical medium portion 110 shown in FIG. 2(c) by a field lens 18. Since the direct light beam LR1 which incidents the first optical medium portion 110 has wavelength it is outputted from the first optical medium portion 110 having a certain phase lag according to the refractive index $n_1$ (1,1) and the thickness t1 of the first optical medium portion 110. On the contrary, the diffractive light beam LD1 incidents the inner second optical medium portion 120a and the outer second optical medium portion 120b shown in FIG. 2(c) by the field lens 18. Since the diffractive light beam LD1 which incidents the inner second optical medium portion 120a and the outer second optical medium portion 120b also has the wavelength $\lambda_1$, it is outputted from the inner second optical medium portion 120a and the outer second optical medium portion 120b having a certain phase lag according to the refractive index n1 (1,2) and the thickness t1 of the inner second optical medium portion 120a and the outer second optical medium portion 120b.

Accordingly, the direct light beam LR1 outputted from the first optical medium portion 110 has a phase lag of $(\lambda_1)/4$ to the diffractive light beam LD1 outputted from the inner second optical medium portion 120a and the outer second optical medium portion 120b due to the relationship shown in Formula 1.

Correspondingly, the direct light beam LR2 incidents a first optical medium portion 110 shown in FIG. 2(c) by a field lens 18. Since the direct light beam LR2 which incidents the first optical medium portion 110 has the wavelength $\lambda_2$, it is outputted from the first optical medium portion 110 having a certain phase lag according to the refractive index n1 (2,1) and the thickness t1 of the first optical medium portion 110. On the contrary, the diffractive light beam LD2 incidents the inner second optical medium portion 120a and the outer second optical medium portion 120b shown in FIG. 2(c) by a field lens 18. Since the diffractive light beam LD2 which incidents the inner second optical medium portion 120a and the outer second optical medium portion 120b also has the wavelength $\lambda_2$, it is outputted from the inner second optical medium portion 120a and the outer second optical medium portion 120b having a certain phase lag according to the refractive index n1 (2,2) and the thickness t1 of the inner second optical medium portion 120a and the outer second optical medium portion 120b.

Accordingly, the direct light beam LR2 outputted from the first optical medium portion 110 has a phase lag of $(\lambda_2)/4$ to the diffractive light beam LD2 outputted from the inner second optical medium portion 120a and the outer second optical medium portion 120b due to the relationship shown in Formula 2.

With using the first optical medium portion 110, the inner second optical medium portion 120a and the outer second optical medium portion 120b which satisfy the above mentioned Formula 1 and Formula 2, a phase of the light beam outputted from the first optical medium portion can be advanced or delayed to the light beam outputted from the inner second optical medium portion 120a and the outer second optical medium portion 120b by one quarter of the wavelength both in the case of the light beam of wavelength $\lambda_1$ and the light beam of wavelength $\lambda_2$.

A phase plate used in the ordinary phase contrast microscope uses air as a medium corresponding to the second optical medium portion, and it can advance or delay a phase of the direct light beam to the diffractive light beam by one quarter of the wavelength due to the refractive index of the first optical medium portion and a refractive index of air. In the case of light beams having a plurality of wavelengths, however, a phase of the direct light beam cannot have a phase lag of one quarter of the wavelength to the diffractive light beam due to dispersion of the first optical medium portion.

On the contrary, the present invention can utilize not only dispersion of the first optical medium but also dispersion of the second optical medium, and satisfy the relationship shown in Formula 1 and Formula 2. Therefore, even in the case of light beams having a plurality of wavelengths, a phase of the direct light beam can have a phase lag of one quarter of the wavelength to the phase of the diffractive light beam.

It is preferable that both the wavelength $\lambda 1$ and the wavelength $\lambda 2$ are within a rage of visible light beams, and difference between the wavelength $\lambda 1$ and the wavelength $\lambda 2$ is maximized. Accordingly, a phase of the direct light beam can have a phase lag of one quarter of the wavelength to a phase of the diffractive light beam in a wide range of visual light beams.

Example 1

$C1=t1(n_1(1,1)-n_2(1,1))/\lambda 1=0.24990$ $C2=t1(n_1(1,2)-n_2(1,2))/\lambda 2=0.25046$ Where $\lambda 1=0.248613$ μm, $\lambda 2=0.65627$ μm for wavelength, $n_1(1,1)=1.60940$ $n_1(1,2)=1.60019$ $n_2(1,1)=1.58835$ $n_2(1,2)=1.57171$ for refractive index, $t1=t2=5.7714$ μm for thickness.

Example 2

$C1=t1(n_1(1,1)-n_2(1,1))/\lambda 1=0.25352$ $C2=t1(n_1(1,2)-n_2(1,2))/\lambda 2=0.24656$ Where $\lambda 1=0.48613$ μm, $\lambda 2=0.65627$ μm for wavelength, $n_1(1,1)=1.59230$ $n_1(1,2)=1.58323$ $n_2(1,1)=1.57616$ $n_2(1,2)=1.56204$ for refractive index, $t1=t2=7.636$ μm for thickness.

Second Embodiment

Figure 3:
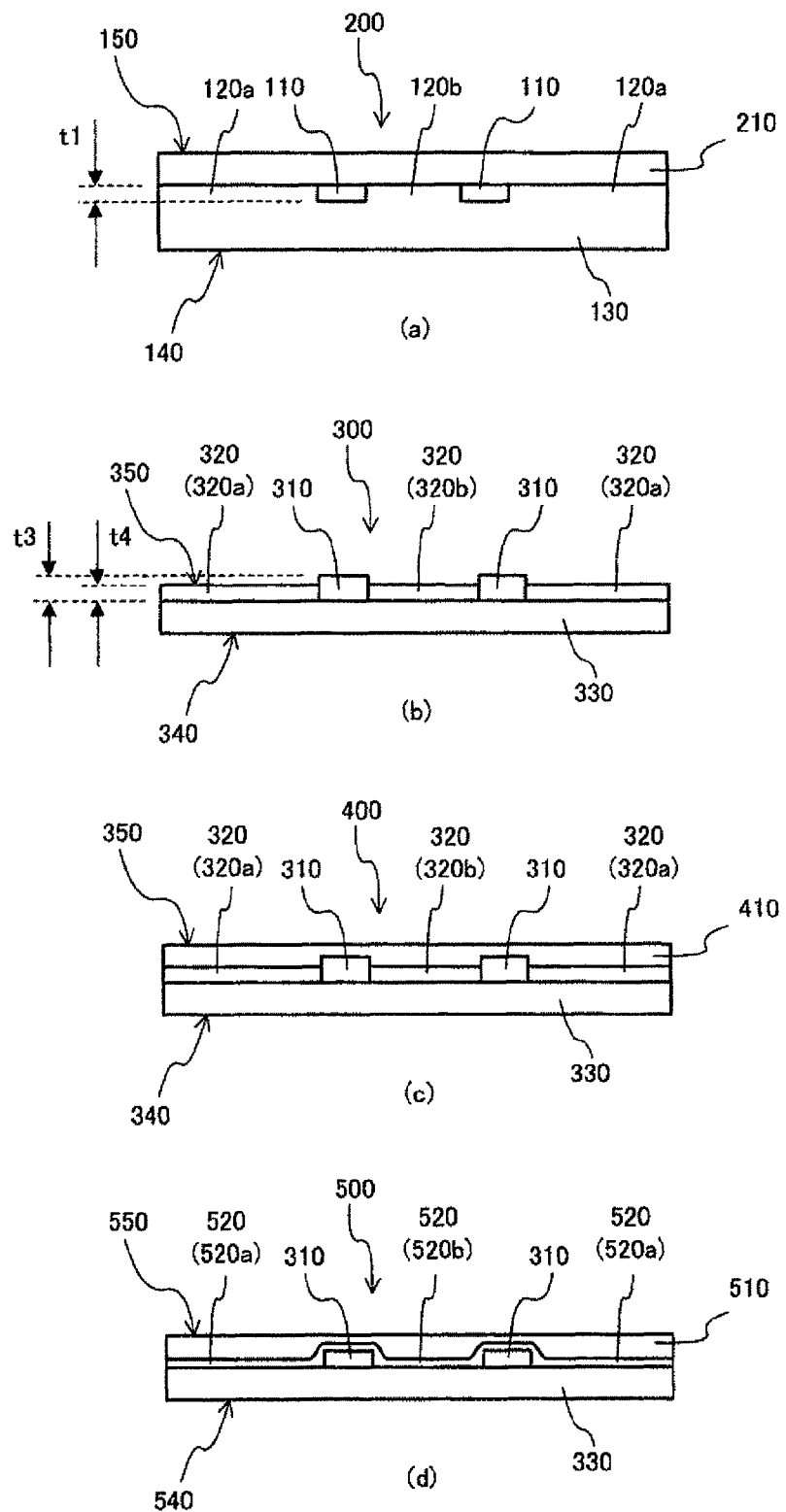
FIG. 3 is a sectional view of a phase plate according to second to fifth embodiments of the present invention.

FIG. 3 (a) illustrates a phase plate 200 according to the second embodiment of the present invention. The same numeral is specified to the items similar to those of the phase plate 100 according to the first embodiment.

The phase plate 200 of the second embodiment is formed by adding a protection glass cover 210 to the phase plate 100 of the first embodiment. While an output surface of the phase plate 200 becomes a top surface of the protection glass cover 210, both the direct light beam and the diffractive light beam can pass through the protection glass cover. Accordingly, with using the first optical medium portion 110, the inner second optical medium portion 120a and the outer second optical medium portion 120b which satisfy the above mentioned Formula 1 and Formula 2, a phase of the light beam outputted from the first optical medium portion can be advanced or delayed to the light beam outputted from the inner second optical medium portion 120a and the outer second optical medium portion 120b by one quarter of the wavelength both in the case of the light beam of wavelength $\lambda 1$ and the light beam of wavelength $\lambda 2$.

Further, since the first optical medium portion 110, the inner second optical medium portion 120a and the outer second optical medium portion 120b are protected by the protection glass cover in the phase plate 200 of the second embodiment, it can increase strength, achieve ease for handling, and protect against damages such as scratches, thereby maintaining an optical property of the phase plate 200.

Third Embodiment

FIG. 3 (b) illustrates a phase plate 300 according to the third embodiment of the present invention. The phase plate 300 of the third embodiment is formed by forming a first optical medium portion 310 and a second optical medium portion 320 on a base portion 330.

As a shape, a size or a material of the first optical medium portion 310 except thickness, those similar to the first optical medium portion 110 of the first embodiment can be utilized. The second optical medium portion 320 is composed of an inner second optical medium portion 320a and an outer second optical medium portion 320b as well as the first embodiment. A bottom surface of the phase plate 300 is an input surface 340 and a top surface of the phase plate 300 is an output surface 350.

As a base portion 330, a glass or a plastic can be used if a light beam can pass through it. Accordingly, since it can omit machine process or mold process or the like, the phase plate 300 can be made easily.

A thickness of the first optical medium portion 310 is different from a thickness of the second optical medium portion 320 in the phase plate 300 of the third embodiment as shown in FIG. 3(b). In this case, a phase can be adjusted using the following formula.

$$t3 \times n_1(1,1) - [t4 \times n_2(1,1) + (t3-t4)] = \frac{1}{4} \times \lambda 1 \qquad \text{Formula 3}$$

$$t3 \times n_1(1,2) - [t4 \times n_2(1,2) + (t3-t4)] = \frac{1}{4} \times \lambda 2 \qquad \text{Formula 4}$$

The wavelength $\lambda 1$, wavelength $\lambda 2$, refractive index $n_1(1,1)$, $n_1(1,2)$, $n_2(1,1)$ and $n_2(1,2)$ are the same as those of the first embodiment, "t3" is a thickness of the first optical medium portion 310, and "t4" is a thickness of the second optical medium portion 320, as shown in FIG. 3(b). A refractive index of air is 1.

With using the first optical medium portion 310 and the second optical medium portion 320 which satisfy the above mentioned Formula 3 and Formula 4, a phase of the light beam outputted from the first optical medium portion 310 can be advanced or delayed to the light beam outputted from the second optical medium portion 320 by one quarter of the wavelength both in the case of the light beam of wavelength λ1 and the light beam of the wavelength λ2.

In the above mentioned case, Formula 3 and Formula 4 are conditions which should be applied to two wavelengths λ1 and λ2. If Formula 3 and Formula 4 are satisfied, there is a case to apply the following formula to the wavelength λ3 which is close to the wavelength λ1 and the wavelength λ2.

$$t3 \times n_1(1,3) - [t4 \times n_2(1,3) + (t3-t4)] = \delta \times \lambda 3 \qquad \text{Formula 5}$$

Where $$|\delta - \tfrac{1}{4}| < 0.02$$

for 5.

The refractive index $n_1(1,3)$ is a refractive index of the first optical medium portion 310 to the wavelength λ3, and the refractive index $n_2(1,3)$ is a refractive index of the first optical medium portion 320 to the wavelength λ3. If "δ" is fully close to ¼, it shows that an adequate phase plate can be obtained in a wide range of λ1, λ2 and λ3.

Fourth Embodiment

FIG. 3(c) illustrates a phase plate 400 according to the fourth embodiment of the present invention. The same numeral is specified to the items similar to those of the phase plate 300 according to the third embodiment.

The phase plate 400 of the fourth embodiment is formed by adding a protection glass cover 410 to the phase plate 300 of the third embodiment. While an output surface of the phase plate 400 becomes a top surface of the protection glass cover 410, both the direct light beam and the diffractive light beam can pass through the protection glass cover. Accordingly, with using the first optical medium portion 310, the inner second optical medium portion 320a and the outer second optical medium portion 320b which satisfy the above mentioned Formula 3 and Formula 4, a phase of the light beam outputted from the first optical medium portion 310 can be advanced or delayed to the light beam outputted from the inner second optical medium portion 320a and the outer second optical medium portion 320b by one quarter of the wavelength both in the case of the light beam of the wavelength λ1 and the light beam of the wavelength λ2.

Further, since the first optical medium portion 310, the inner second optical medium portion 320a and the outer second optical medium portion 320b are protected by the protection glass cover in the phase plate 400 of the fourth embodiment, it can increase strength, achieve ease in handling, and protect against damages such as scratches, thereby maintaining an optical property of the phase plate 400.

Fifth Embodiment

FIG. 3(d) illustrates a phase plate 500 according to the fifth embodiment of the present invention. The same numeral is specified to the items similar to those of the phase plate 300 according to the third embodiment.

The phase plate 500 of the fifth embodiment is configured such that the first optical medium portion 310 is covered with a second optical medium portion 520. Further, the second optical medium portion 520 is covered with a protection layer 510. A bottom surface of the phase plate 510 is an input surface 540 and a top surface of the phase plate 510 is an output surface 550.

For the second optical medium portion 520, those similar to the second optical medium portion 120 according to the first embodiment can be utilized. The second optical medium portion 520 of the phase plate 500 is composed of an inner second optical medium portion 520a and an outer second optical medium portion 520b as well as the first embodiment. Accordingly, the first optical medium portion 310 can be adequately protected by covering the first optical medium portion 310 with the second optical medium portion 520. Further, since entire surface of the second optical medium portion 520 is covered with the protection layer 510, both the first optical medium layer 310 and the second optical medium portion 520 can be protected. It can also achieve ease in handling, and protect against damages, thereby maintaining an optical property of the phase plate for a long period.

<<<Common Description of Embodiments 1 to 5>>>

Figure 4:
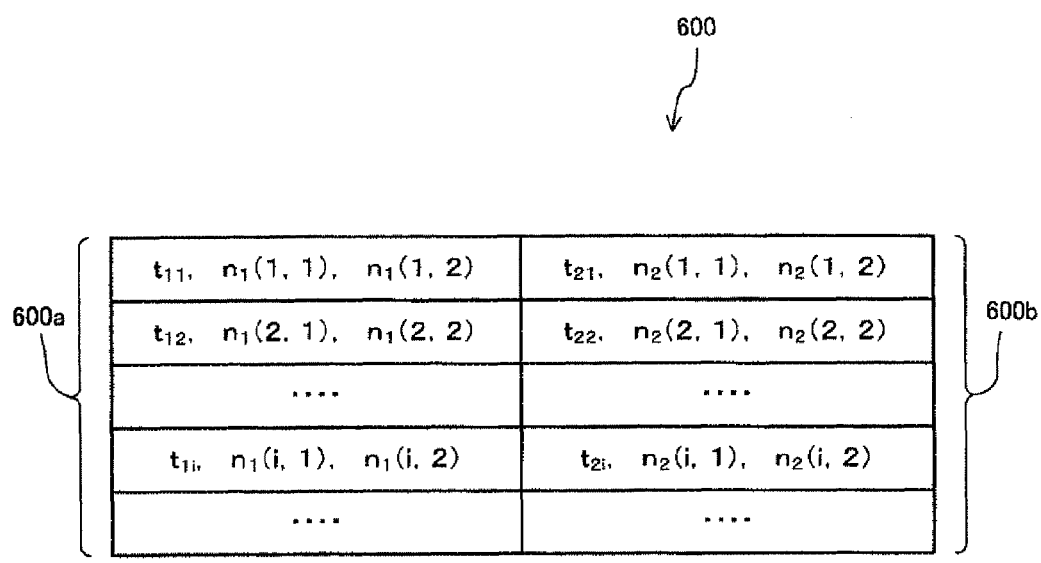
FIG. 4 is a sectional view to show a general concept of a phase plate according to first to fifth embodiments of the present invention.

FIG. 4 illustrates a phase plate 600 which generalizes phase plates according to the above mentioned embodiments 1 to 5. An item shown at the left side of the phase plate 600 in FIG. 4 is a first optical medium portion 600a to which the first optical medium portion is generalized, and an item shown at the right side of the phase plate 600 is a second optical medium portion 600b to which the second optical medium portion is generalized. The first optical medium portion 600a and the second optical medium portion 600b are formed of at least one layer.

In the embodiment shown in FIG. 4, a first layer 602-1 of a first optical medium portion 600a shows the refractive index $n_1(1,1)$ to a light beam of the wavelength λ1 with the thickness $t_{11}$, and shows the refractive index $n_1(1,2)$ to a light beam of the wavelength λ2. A second layer 602-2 of the first optical medium portion 600a shows the refractive index $n_1(2,1)$ to a light beam of the wavelength λ1 with the thickness $t_{12}$, and shows the refractive index $n_1(2,2)$ to the light beam of the wavelength λ2. Further, an "$i^{th}$" layer 602-$i$ of the first optical medium portion 600a shows the refractive index $n_1(i,1)$ to the light beam of the wavelength λ1 with the thickness t1$i$, and shows the refractive index $n_1(i,2)$ to the light beam of the wavelength λ2.

A first layer 604-1 of a second optical medium portion 600b shows the refractive index $n_2(1,1)$ to the light beam of the wavelength λ1 with the thickness $t_{21}$, and shows the refractive index $n_2(1,2)$ to the light beam of the wavelength λ2. A second layer 604-2 of the second optical medium portion 600b shows the refractive index $n_2(2,1)$ to the light beam of the wavelength λ1 with the thickness $t_{22}$, and shows the refractive index $n_2(2,2)$ to the light beam of the wavelength λ2. Further, an "$i^{th}$" layer 604-$i$ of the second optical medium portion 600b shows the refractive index $n_2(i,1)$ to the light beam of the wavelength λ1 with the thickness $t_{2i}$, and shows the refractive index $n_2(i,2)$ to the light beam of the wavelength λ2.

Both light beams of the wavelength λ1 and the wavelength λ2 can pass through all the layers of the above mentioned first optical medium portion 600a, and both light beams of the wavelength λ1 and the wavelength λ2 can pass through all the layers of the above mentioned second optical medium portion 600b.

In the case of the phase plate 600 composed of the first optical medium portion 600a and the second optical medium portion 600b, a phase can be adjusted with using the following three formulas.

$$\sum_i t_{1i} \times n_1(i, 1) - \sum_j t_{2j} \times n_2(j, 1) = C1\lambda_1 \qquad \text{Formula 6}$$

$$\sum_i t_{1i} \times n_1(i, 2) - \sum_j t_{2j} \times n_2(j, 2) = C2\lambda_2 \qquad \text{Formula 7}$$

$$|C1 - C2| < 0.02 \qquad \text{Formula 8}$$

With using the first optical medium portion 600 and the second optical medium portion 600b which satisfy the above mentioned Formula 6, Formula 7 and Formula 8, a phase of the light beam outputted from the first optical medium portion 600a can be advanced or delayed to the light beam outputted from the second optical medium portion 600b by C1 (to C2) both in the case of the light beam of the wavelength λ1 and the light beam of the wavelength λ2.

DESCRIPTION OF REFERENCE NUMERALS

| | |
|---|---|
| 10 | Phase contrast microscope |
| 100, 200, 300, 400, 500, 600 | Phase plate (Optical component) |
| 110, 310 | First optical medium portion (First optical medium area) |
| 120, 320, 520 | Second optical medium portion (Second optical medium area) |
| 140, 340, 540 | Input surface |
| 150, 350, 550 | Output surface |
| 600a | First optical medium portion (First optical medium area) |
| 600b | Second optical medium portion (Second optical medium area) |

The invention claimed is:

1. An optical component including an input surface which receives light beams of at least two wavelengths, and an output surface which outputs the light beams after changing a phase of the received light beam, comprising:
  an optical medium body which includes at least two optical mediums arranged side by side between said input surface and said output surface, said optical medium body including:
    a first optical medium portion which outputs each of said light beams of at least two wavelengths after changing a phase thereof according to the wavelength,
    a second optical medium portion which outputs each of said light beams of at least two wavelengths after changing a phase thereof according to the wavelength so that difference between a phase of the light beam outputted from said first optical medium portion and a phase of the light beam outputted from said second optical medium portion is approximately constant,
  wherein said first optical medium portion is composed of at least one optical medium layer,
  said second optical medium portion is composed of at least one optical medium layer,
  the following three formulas are applied to said first optical medium portion and said second optical medium portion, $$\sum_i t_{1i} \times n_1(i, 1) - \sum_j t_{2j} \times n_2(j, 1) = C1\lambda_1$$

$$\sum_i t_{1i} \times n_1(i, 2) - \sum_j t_{2j} \times n_2(j, 2) = C2\lambda_2$$

$$|C1 - C2| < 0.02$$

a thickness of $i^{th}$ layer of said first optical medium portion is the thickness $t_{1i}$,
    a refractive index to the light beam of the wavelength λ1 is the refractive index $n_1(i,1)$,
    a refractive index to the light beam of the wavelength λ2 is the refractive index $n_1(i,2)$,
  a thickness of $j^{th}$ layer of said second optical medium portion is the thickness $t_{1j}$,
    a refractive index to the light beam of the wavelength λ1 is the refractive index $n_2(j,1)$,
    a refractive index to the light beam of the wavelength λ2 is the refractive index $n_2(j,2)$,
  C1 and C2 are constants which are not related to wavelength; and
  wherein the thickness and index of refraction of the first and second optical medium portions are such that a phase delay for two different wavelengths λ1 and λ2 are substantially the same.

2. The optical component according to claim 1, wherein:
  said light beams of at least two wavelengths include the first wavelength λ1 and the second wavelength λ2,
  said first optical medium portion and said second optical medium portion are formed of a single optical medium respectively,
  the following three formulas are applied to said first optical medium portion and said second optical medium portion;

$$t(n_1(1,1) - n_2(1,1)) = C1 \times \lambda 1$$

$$t(n_1(1,2) - n_2(1,2)) = C1 \times \lambda 2$$

$$|C1 - C2| < 0.02$$

where a thickness of said first optical medium portion and said second optical medium portion is the thickness t,
  a refractive index of said first optical medium portion to the light beam of the first wavelength λ1 is the refractive index $n_1(1,1)$,
  a refractive index of said first optical medium portion to the light beam of the second wavelength λ2 is the refractive index $n_j(1,2)$,
  a refractive index of said second optical medium portion to the light beam of the first wavelength λ1 is the refractive index $n_2(1,1)$,
  a refractive index of said second optical medium portion to the light beam of the second wavelength λ2 is the refractive index $n_2(1,2)$.

3. The optical component according to claim 2, wherein a formula of $$|n1(1,1) - n2(1,2)| < 0.3$$

is satisfied.

4. The optical component according to claim 1, wherein the two different wavelengths are wavelengths of visual light beams.

5. A phase contrast microscope including an illumination optical system, and an image optical system, comprising:
- an opening arranged at a pupil position of said illumination optical system,
- a phase plate arranged at a position having a conjugated relationship with said opening,
- said phase plate including:
- an input surface which receives light beams of at least two wavelengths,
- an output surface which outputs the light beams after changing a phase of the received light beam, and
- an optical medium body which includes at least two optical mediums arranged side by side between said input surface and said output surface,
- said optical medium body including:
  - a first optical medium portion which outputs each of said light beams of at least two wavelengths after changing a phase thereof according to the wavelength,
  - a second optical medium portion which outputs each of said light beams of at least two wavelengths after changing a phase thereof according to the wavelength so that difference between a phase of the light beam outputted from said first optical medium portion and a phase of the light beam outputted from said second optical medium portion is approximately constant,
- wherein said first optical medium portion is composed of at least one optical medium layer,
- said second optical medium portion is composed of at least one optical medium layer,
- the following three formulas are applied to said first optical medium portion and said second optical medium portion, $$\sum_i t_{1i} \times n_1(i, 1) - \sum_j t_{2j} \times n_2(j, 1) = C1\lambda_1$$

$$\sum_i t_{1i} \times n_1(i, 2) - \sum_j t_{2j} \times n_2(j, 2) = C2\lambda_2$$

$$|C1 - C2| < 0.02$$

- a thickness of $i^{th}$ layer of said first optical medium portion is the thickness $t_{1i}$,
- a refractive index to the light beam of the wavelength $\lambda 1$ is the refractive index $n_1(i,1)$,
- a refractive index to the light beam of the wavelength $\lambda 2$ is the refractive index $n_1(i,2)$,
- a thickness of $i^{th}$ layer of said second optical medium portion is the thickness $t_{1i}$,
- a refractive index to the light beam of the wavelength $\lambda 1$ is the refractive index $n_2(i,1)$,
- a refractive index to the light beam of the wavelength $\lambda 2$ is the refractive index $n_2(i,2)$, C1 and C2 are constants which are not related to wavelength; and wherein the thickness and index of refraction of the first and second optical medium portions are such that a phase delay for two different wavelengths $\lambda 1$ and $\lambda 2$ are substantially the same.

* * * * *